(12) United States Patent
Wu et al.

(10) Patent No.: US 9,716,826 B2
(45) Date of Patent: Jul. 25, 2017

(54) GUIDED IMAGE CAPTURE

(75) Inventors: Yi Wu, San Jose, CA (US); Maha El Choubassi, San Jose, CA (US); Igor V. Kozintsev, San Jose, CA (US); Richard T. Beckwith, Santa Clara, CA (US); Kenneth T. Anderson, Santa Clara, CA (US); Maria Bezaitis, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 212 days.

(21) Appl. No.: 13/997,990

(22) PCT Filed: Dec. 7, 2011

(86) PCT No.: PCT/US2011/063833
§ 371 (c)(1),
(2), (4) Date: May 2, 2014

(87) PCT Pub. No.: WO2013/085512
PCT Pub. Date: Jun. 13, 2013

(65) Prior Publication Data
US 2014/0247325 A1    Sep. 4, 2014

(51) Int. Cl.
*H04N 7/00* (2011.01)
*H04N 5/232* (2006.01)
*H04N 13/02* (2006.01)

(52) U.S. Cl.
CPC ..... *H04N 5/23222* (2013.01); *H04N 5/23206* (2013.01); *H04N 5/23238* (2013.01); *H04N 13/021* (2013.01); *H04N 13/0296* (2013.01)

(58) Field of Classification Search
CPC ........... H04N 5/23222; H04N 5/23206; H04N 5/23238; H04N 13/021; H04N 13/0296
See application file for complete search history.

(56) References Cited

U.S. PATENT DOCUMENTS

| 8,537,236 B2 * | 9/2013 | Yost .................. H04N 5/23222 348/211.99 |
| 2009/0162042 A1 | 6/2009 | Wexler et al. |
| 2009/0231441 A1 | 9/2009 | Walker et al. |
| 2010/0074613 A1 | 3/2010 | Masuno et al. |

(Continued)

FOREIGN PATENT DOCUMENTS

| JP | 2008066886 | 3/2008 |
| JP | 2010256253 | 4/2009 |
| WO | WO 2011014420 A1 * | 2/2011 ........... G06T 7/0075 |

OTHER PUBLICATIONS

International Search Report and Written Opinion mailed Aug. 24, 2012 for corresponding PCT/US2011/063833 filed Dec. 7, 2011 (nine (9) pages).

(Continued)

*Primary Examiner* — Tat Chio

(57) ABSTRACT

Examples are disclosed for determining a suggested camera pose or suggested camera settings for a user to capture one or more images. In some examples, the suggested camera pose or suggested camera settings may be based on an indication of the user's interest and gathered information associated with the user's interests. The user may be guided to adjust an actual camera pose or actual camera settings to match the suggested camera pose or suggested camera settings.

28 Claims, 10 Drawing Sheets

(56) References Cited

U.S. PATENT DOCUMENTS

| | | |
|---|---|---|
| 2010/0149399 A1 | 6/2010 | Mukai et al. |
| 2010/0191459 A1 | 7/2010 | Carter et al. |
| 2011/0012989 A1* | 1/2011 | Tseng ..................... G03B 17/20 348/36 |
| 2011/0025829 A1 | 2/2011 | McNamer et al. |
| 2011/0050909 A1* | 3/2011 | Ellenby ................. G03B 17/24 348/207.1 |
| 2011/0069179 A1 | 3/2011 | Bathiche et al. |
| 2011/0201939 A1 | 8/2011 | Hubschman et al. |
| 2011/0211764 A1* | 9/2011 | Krupka ............. G06F 17/30247 382/225 |
| 2012/0321131 A1 | 12/2012 | Kobayashi |
| 2013/0095855 A1* | 4/2013 | Bort ........................ G06T 17/05 455/456.2 |

OTHER PUBLICATIONS

Extended European Search Report received for European Patent Application No. 11877062.7, mailed May 18, 2015, 6 pages.

Office Action received for Japanese Patent Application No. 2014-545866, mailed Jun. 16, 2015, 7 pages including 4 pages English translation.

Office Action received for Japanese Patent Application No. 2014-545866, Mailed Jul. 5, 2016, 10 pages including 5 pages English translation.

\* cited by examiner

GUIDED IMAGE CAPTURE

BACKGROUND

Image capture devices coupled with or integrated on mobile computing devices are increasingly becoming a common means of taking photos. Also, mobile computing devices such as smart phones or tablets are including enhanced wireless/4G networking capabilities and increased computational power. As the quality and resolution of digital cameras coupled with or integrated on mobile computing devices improve, many users may rely on these types of cameras as a primary means to take photos. In some examples, vacations or special events may be captured with these types of digital cameras. Additionally, the wireless networking capabilities allow users to quickly share captured images with their social network or add captured images to network accessible, on-line photo galleries.

DETAILED DESCRIPTION

As contemplated in the present disclosure, the improving quality and resolution of digital cameras coupled with or integrated on mobile computing devices may lead to users relying on these types of cameras as a primary means to take photos or capture images. Yet, these users may have a limited ability to touch-up or edit captured images with mobile computing devices. Sometimes, captured images may have been captured at unfavorable angles, locations, directions or lighting conditions. Proper camera settings such as flash, aperture or shutter speeds may have been slightly off resulting in blurry, darkened or overexposed images. However, increasing computational power, location determining capabilities and wireless networking capabilities of mobile computing devices may enable these mobile computing devices an ability to provide a user guidance that matches their intentions or interests. These interests may include capturing a unique image compared to other images captured by friends in a user's social network or capturing a panoramic or three-dimensional (3-D) image.

In some examples, techniques are implemented for guiding a user when capturing an image. For these examples, a processor circuit may receive an indication of a user's interest in capturing one or more images with a camera and may gather information associated with the user's interest. A determination may then be made on a suggested camera pose (including the camera location and orientation) based on the indication of the user's interest and the gathered information. The user may then be guided to adjust an actual camera pose to match the suggested camera pose.

Figure 1:
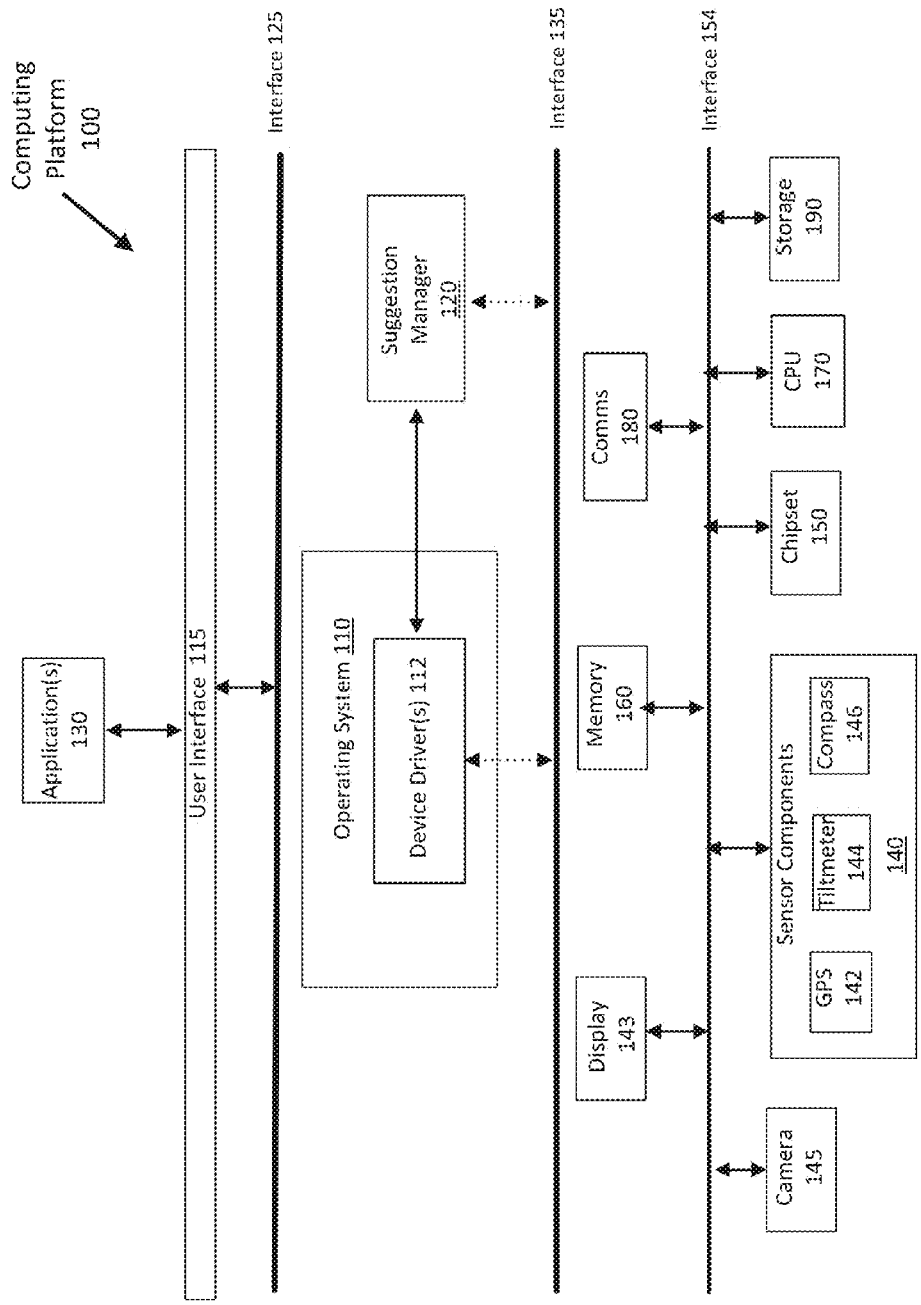
FIG. 1 illustrates an example computing platform.

FIG. 1 illustrates an example computing platform 100. As shown in FIG. 1, computing platform 100 includes an operating system 110, an suggestion manager 120, application(s) 130, sensor components 140, a display 143, camera 145, a chipset 150, a memory 160, a central processing unit (CPU) 170, a communications (comms) 180 and storage 190. According to some examples, several interfaces are also depicted in FIG. 1 for interconnecting and/or communicatively coupling elements of computing platform 100. For example, user interface 115 and interface 125 may allow for users (not shown) and/or application(s) 130 to couple to operating system 110. Also, interface 135 may allow for suggestion manager 120 or elements of operating system 110 (e.g., device driver(s) 112) to communicatively couple to elements of computing platform 100 such as sensor components 140, display 143, camera 145, memory 160, CPU 170 or comms 180. Interface 154, for example, may allow hardware and/or firmware elements of computing platform 100 to communicatively couple together, e.g., via a system bus or other type of internal communication channel.

In some examples, as shown in FIG. 1, application(s) 130 may include applications associated with, but not limited to, a social network or a network accessible, on-line photo gallery. For these examples, as described more below, application 130 may enable suggestion manager 120 to gather information associated with a user's interest in capturing an image at a given location. That gathered information, for example, might include information regarding images captured at the given location by either the user in the past or by members of the user's social network.

According to some examples, as shown in FIG. 1, operating system 110 may include device driver(s) 112. Device driver(s) 112 may include logic and/or features configured to interact with hardware/firmware type elements of computing platform 100 (e.g., via interface 135). For example, device driver(s) 112 may include device drivers to control orientation components 140, display 143 or camera 145. Device driver(s) 112 may also interact with suggestion manager 120 to perhaps gather information associated with a user's interest (e.g., via comms 180), obtain location, direction or angle information (e.g., via sensor components 140) or provide suggestions for a camera pose (e.g., via display 143).

As shown in FIG. 1, sensor components 140 include global position satellite (GPS) 142, tiltmeter 144 or compass 146. In some examples, GPS 142 may enable a computing device having computing platform 100 to have location determination capabilities. For these examples, tiltmeter 144 may enable the computing device to determine an angle orientation of camera 145. Also, compass 146 may enable the computing device to determine the direction that camera 145 is pointed when orientating camera 145 to capture an image.

In some examples, as described more below, suggestion manager 120 may include logic and/or features configured to receive information (e.g., from application(s) 130 and/or a user). The information may include an indication of a user's interest in capturing one or more images with a camera (e.g., camera 145). Suggestion manager 120 may also gather information associated with the user's interest (e.g., from a social network) and determine a suggested camera pose based on the indication of the user's interest and the gathered information. The user may then be guided (e.g., via feedback to display 143) to adjust an actual camera pose using information obtained from sensor components 140. The information obtained from sensor components 140 (e.g., location, direction, camera angle) may enable the user to match the suggested pose.

In some examples, chipset 150 may provide intercommunication among operating system 110, orientation components 140, display 143, camera(s) 145, memory 160, CPU 170, comms 180 or storage 190.

According to some examples, memory 160 may be implemented as a volatile memory device utilized by various elements of computing platform 100 (e.g., as off-chip memory). For these implementations, memory 150 may include, but is not limited to, random access memory (RAM), dynamic random access memory (DRAM) or static RAM (SRAM).

According to some examples, CPU 170 may be implemented as a central processing unit for computing platform 100. CPU 170 may include one or more processing units having one or more processor cores or having any number of processors having any number of processor cores. CPU 170 may include any type of processing unit, such as, for example, a multi-processing unit, a reduced instruction set computer (RISC), a processor having a pipeline, a complex instruction set computer (CISC), digital signal processor (DSP), and so forth.

In some examples, comms 180 may include logic and/or features to enable computing platform 100 to communicate externally with elements remote to computing platform 100. These logic and/or features may include communicating over wired and/or wireless communication channels or connections via one or more wired or wireless networks. In communicating across such networks, comms 180 may operate in accordance with one or more applicable communication or networking standards in any version.

In some examples, storage 190 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

As mentioned above, interface 154, may allow hardware and/or firmware elements of computing platform 100 to communicatively couple together. According to some examples, communication channels interface 154 may operate in accordance with one or more protocols or standards. These protocols or standards may be described in one or one or more industry standards (including progenies and variants) such as those associated with the Inter-Integrated Circuit (I²C) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

In some examples, computing platform 100 may be at least part of a mobile computing device. Examples of a mobile computing device may include a laptop computer, ultra-mobile computer, tablet, touch pad, portable computer, handheld computer, palmtop computer, personal digital assistant (PDA), cellular telephone, combination cellular telephone/PDA, smart device (e.g., smart phone, smart tablet, or smart television), mobile internet device (MID), messaging device, data communication device, and so forth.

Figure 2:
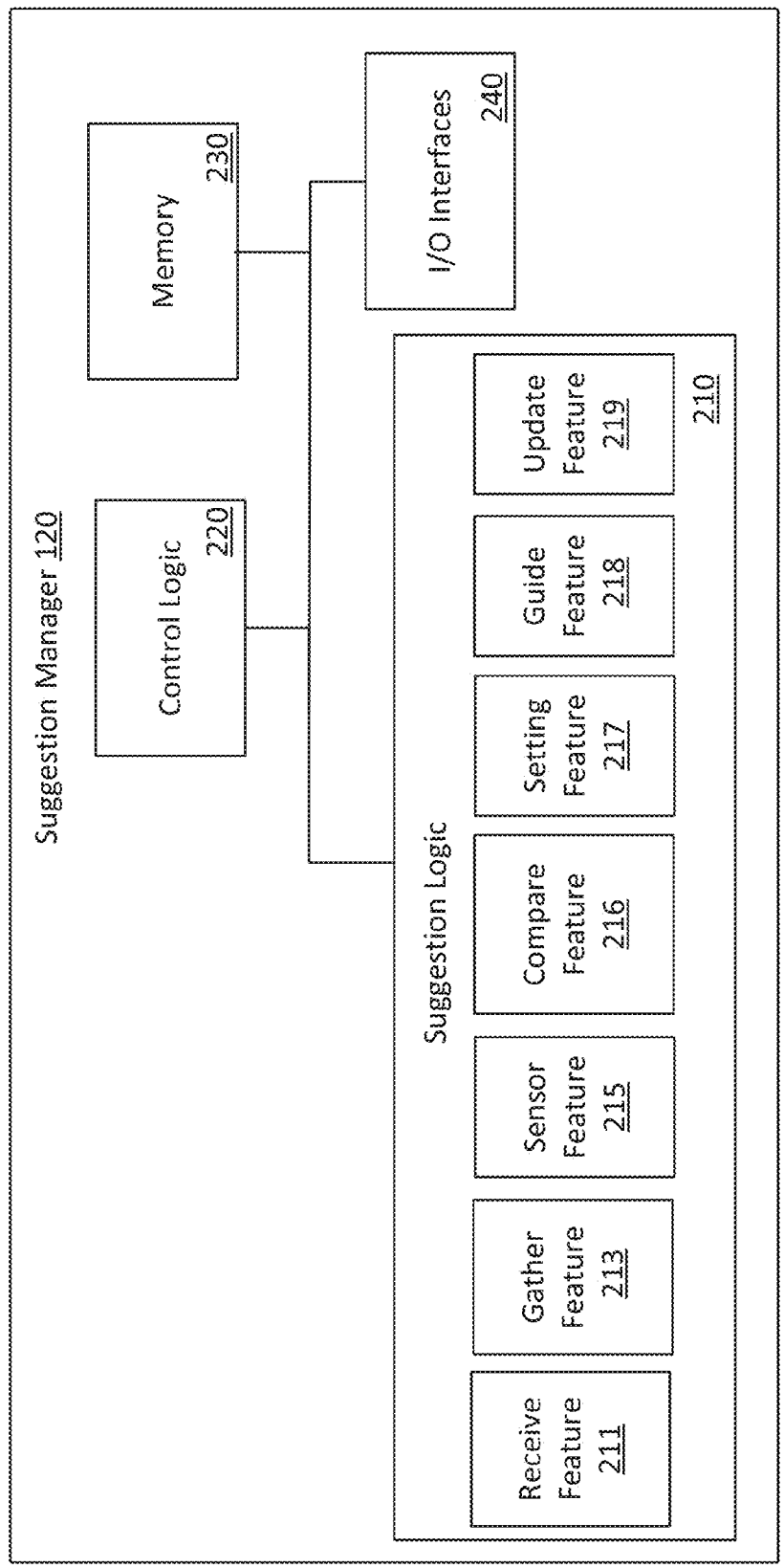
FIG. 2 illustrates a block diagram of an example architecture for a suggestion manager.

FIG. 2 illustrates a block diagram of an example architecture for suggestion manager 120. In some examples, suggestion manager 120 includes features and/or logic configured or arranged to determine a suggested camera pose (including position and orientation) or suggested camera settings for a user to capture one or more images. The features and/or logic may also be configured to guide a user to adjust an actual camera pose or actual camera settings to match the suggested camera pose or camera settings and responsive to an image capture possibly updating the suggested camera pose or camera settings.

According to some examples, as shown in FIG. 2, suggestion manager 120 includes suggestion logic 210, control logic 220, a memory 230 and input/output (I/O) interfaces 240. As illustrated in FIG. 2, suggestion logic 210 may be coupled to control logic 220, memory 230 and I/O interfaces 240. Suggestion logic 210 may include one or more of a receive feature 211, a gather feature 213, a sensor feature 215, a compare feature 216, a setting feature 217, a guide feature 218 or an update feature 219, or any reasonable combination thereof.

In some examples, the elements portrayed in FIG. 2 are configured to support or enable suggestion manager 120 as described in this disclosure. A given suggestion manager 120 may include some, all or more elements than those depicted in FIG. 2. For example, suggestion logic 210 and control logic 220 may separately or collectively represent a wide variety of logic device(s) or executable content to implement the features of suggestion manager 120. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor or a combination thereof.

In some examples, as shown in FIG. 2, suggestion logic 210 includes receive feature 211, gather feature 213, sensor feature 215, compare feature 216 setting feature 217, guide feature 218 or update feature 219. Suggestion logic 210 may be configured to use one or more of these features to perform operations. For example, receive feature 211 may receive an indication of a user's interest in capturing one or more images with a camera. Gather feature 213 may gather information associated with the user's interest. Sensor feature 215, compare feature 216 or setting feature 217 may help determine suggested camera pose and camera settings, respectively, based on the indication of the user's interest and the gathered information. Guide feature 218 may guide the user to adjust an actual camera pose or actual camera settings to match the suggested camera pose or the suggested camera settings. Update feature 219 may update an existing panoramic or 3-D image responsive to an image capture by the user at the given location.

In some examples, control logic 220 may be configured to control the overall operation of suggestion manager 120. As mentioned above, control logic 220 may represent any of a wide variety of logic device(s) or executable content. For some examples, control logic 220 may be configured to operate in conjunction with executable content or instructions to implement the control of suggestion manager 120. In some alternate examples, the features and functionality of control logic 220 may be implemented within suggestion logic 210.

According to some examples, memory 230 may be arranged to store executable content or instructions for use by control logic 220 and/or suggestion logic 210. The executable content or instructions may be used to implement or activate features or elements of suggestion manager 120.

As described more below, memory 230 may also be arranged to at least temporarily maintain information associated a user's interest to capture an image. Memory 230 may also at least temporarily maintain suggestion information to guide the user when capturing the image. Memory 230 may also at least temporarily maintain information associated with updating a panoramic or 3-D image responsive to the user capturing the image.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between suggestion manager 120 and elements of computing platform 100 depicted in FIG. 1. I/O interfaces 240 may include interfaces that operate according to various communication protocols to communicate over the local communication medium or link (e.g., $I^2C$, SMBus, AGP, PCI Express, USB, SATA, etc).

Figure 3:
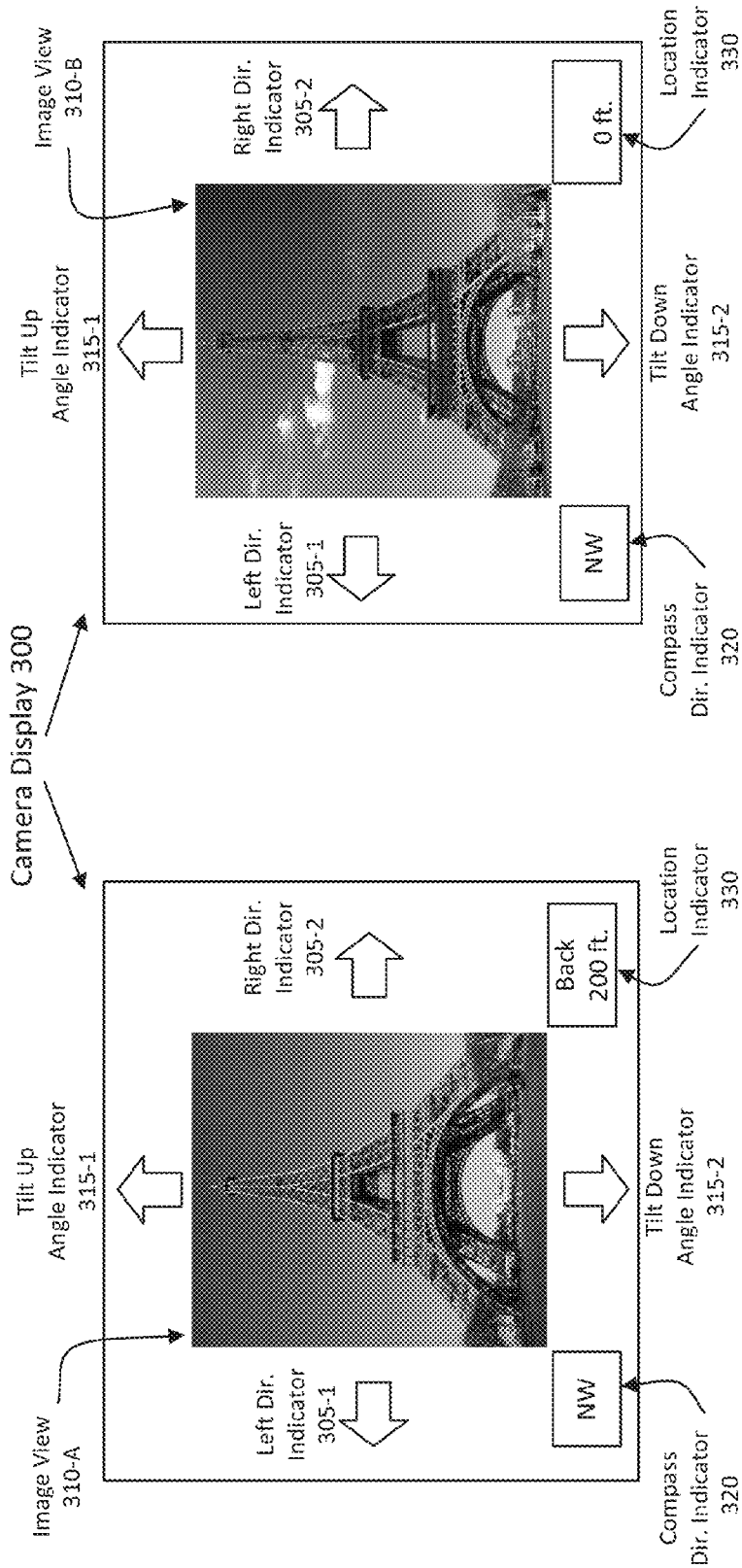
FIG. 3 illustrates an example camera display for capturing an image at a given location.

FIG. 3 illustrates an example camera display 300 for capturing an image at a given location. In some examples, camera display 300 includes an image view 310-A. Image view 310-A may be what a user observes when first orienting a camera to capture an image. For these examples, camera display 300 includes left and right direction indicators 305-1 and 305-2 as well as tilt up and down indicators 315-1 and 315-2. Camera display 300 also includes a compass direction indicator 320 and a location indicator 330.

In some examples, image view 310-B may represent a view after a user has oriented an actual camera pose to match a suggested camera pose. For these examples, image view 310-A reflects what the user observed before orienting the camera based on guidance provided via feedback on camera display 300. As shown on the left-side camera display 300 in FIG. 3, feedback was provided via compass direction indicator 320 and location indicator 330. For compass direction indicator 320 and location indicator 330, suggestion manager 120 may include logic and/or features to cause camera display 300 to indicate a suggested camera orientation in a northwest (NW) direction and a suggested camera location of back 200 feet. As shown on the right-side camera display 300 in FIG. 3, the user oriented the camera to match the suggestion and thus compass direction indicator 320 still indicates a NW direction and location indicator 330 now indicates 0 feet.

According to some examples, although not shown in FIG. 3, tilt up or down angle indicators 315-1 and 315-2, respectively, may have provided indications of a suggested camera pose. Left or right directional indicators 305-1 and 305-2 may also have provided indications of a suggested camera pose. For tilt up/down or left/right directional indicators 315-1,2 or 305-1,2, respectively, suggestion manager 120 may include logic and/or features to cause camera display 300 to indicate a suggested camera pose. For example, suggestion manager 120 may cause the arrows associated with these indicators to flash or change colors to indicate whether the user has adjusted an actual camera pose to match the suggested camera pose. The arrows may be colored red and flash in the direction (e.g., up/down or left/right) to orient the camera and then turn green and stop flashing once the actual camera pose matches the suggested camera pose.

In some examples, suggestion manager 120 may also include logic and/or features to provide suggested settings to include, but not limited to, a flash setting, an aperture setting, a shutter speed or a zoom setting. Although not shown in FIG. 3, one or more setting indicators may be included in camera display 300 to guide the user to adjust actual camera settings to match the suggested camera settings. Thus, for example, when capturing the image at the given location, settings may be suggested based on conditions at the given location (e.g., ambient light, distance to object being captured, movement of the object relative to the user, etc.). In alternative examples, the user may be a member of a social network and the suggested settings may be based on setting used by some members of the user's social network as they captured images at the given location.

Figure 4:
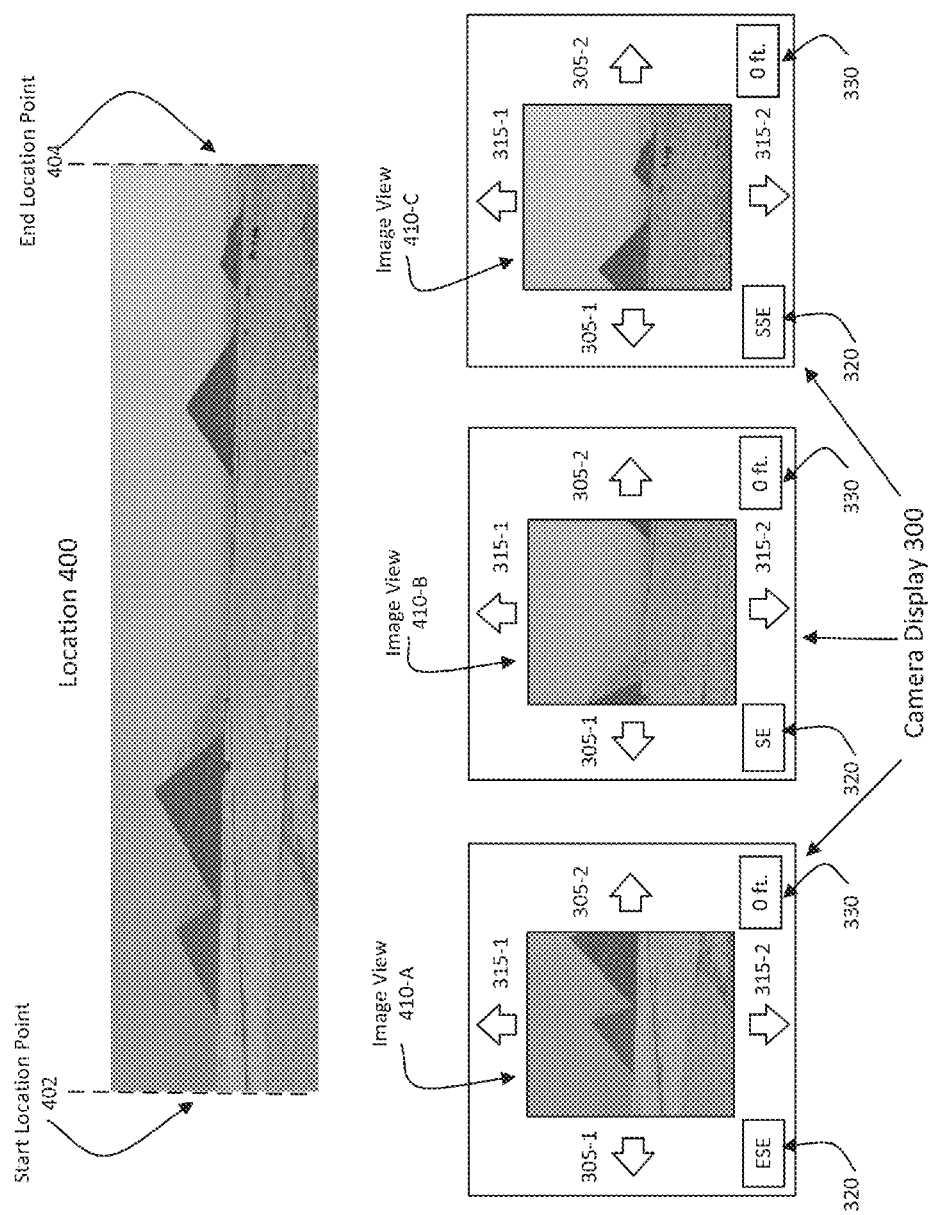
FIG. 4 illustrates an example camera display for capturing a panoramic image at a given location.

FIG. 4 illustrates example camera display 300 for capturing a panoramic image at a given location 400. In some examples, image views 410-A, 410-B and 410-C may represent views after a user has oriented an actual camera pose to match a suggested camera pose for capturing the panoramic image at location 400. For these examples, location 400 may be a location that allows for capturing a panoramic image of the Great Pyramids of Egypt. In order to capture all of the pyramids in the panoramic image, suggestion manager 120 may include logic and/or features to determine a start location point 402 and an end location point 404 for location 400.

According to some examples, suggestion manager 120 may determine that three separate images may be needed to capture all the pyramids in the panoramic image. These three separate images are shown in FIG. 4 as image view 410-A, 410-B and 410-C. For these examples, based on that determination, suggestion manager 120 may then determine a start or first suggested camera pose at start location 402 and an end or third suggested camera pose at location 404. As shown in FIG. 4, the suggested camera pose indicated in compass direction indicator 320 is to the east-southeast (ESE) for image view 410-A. Then for the second image capture (image view 410-B), the suggested camera pose indicated in compass direction indicator 320 is to the southeast (SE). Lastly, for the third image capture (image view 410-C), the suggested camera pose indicated in compass indicator 320 is to the south-southeast (SSE).

In some examples, although not shown in FIG. 4, tilt up or down angle indicators 315-1 and 315-2, respectively, may have provided indications of a suggested camera pose. Left or right directional indicators 305-1 and 305-2 may also have provided indications of a suggested camera pose. Similar to what was mentioned above for FIG. 3, suggestion manager 120 may cause the arrows associated with these indicators to flash or change colors to indicate whether the user has adjusted an actual camera pose to match the suggested camera pose.

According to some examples, suggestion manager 120 may adaptively provide suggested camera poses for subsequent camera poses based on previously captured images. For example, rather than predetermining the number of images needed to capture a panoramic image, suggestion manager 120 may include logic and/or features to update the panoramic image after each image is captured. Suggestion manager 120 may then determine an updated camera pose based on the updated panoramic image. Thus, suggestion manager 120 may determine if any gaps exist between start location point 402 and end location point 404 and then guide a user to orient the camera for subsequent image capture(s) in order to fill in any possible gaps.

According to some examples, suggestion manager 120 may provide suggested settings similar to the suggested settings mentioned above for FIG. 3. Thus, for example, when capturing the image at location 400, settings may be suggested based on conditions at location 400. In alternative examples, the user may be a member of a social network and the suggested settings may be based on setting used by some members of the user's social network as they captured images at location 400.

Figure 5:
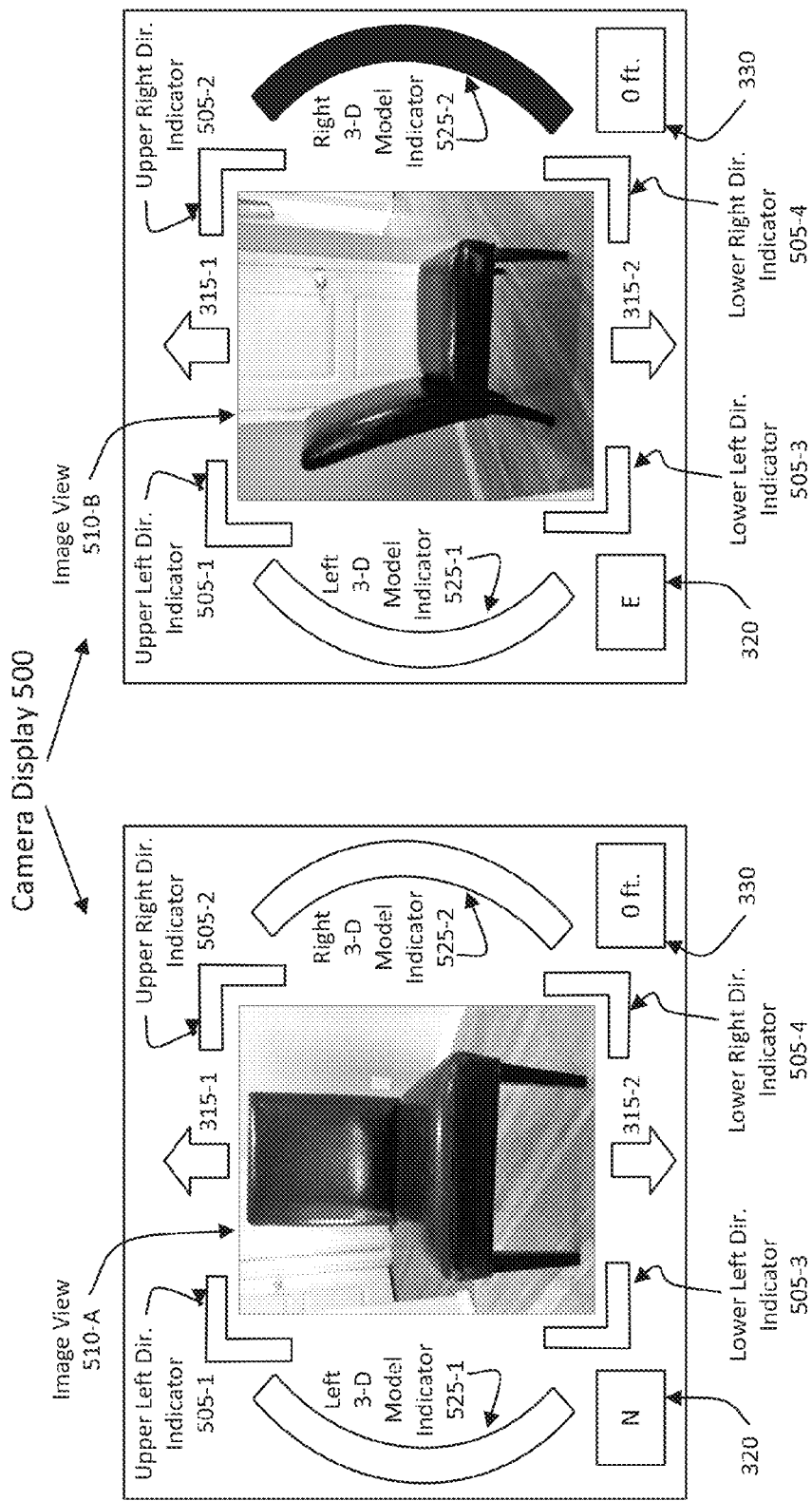
FIG. 5 illustrates an example camera display for capturing a three-dimensional (3-D) image at a given location.

FIG. 5 illustrates an example camera display 500 for capturing a 3-D image at a given location. In some examples, camera display 500 includes an image view 510-A. Image view 510-A may be what a user observes when first orienting a camera to capture a first of a series of images according to a suggested 3-D model. For these examples, camera display 500 includes upper left/right direction indicators 505-1 and 505-2 as well as lower left/right direction indicators 505-3 and 505-4. Similar to FIGS. 3 and 4, camera display 500 also includes tilt up/down indicators 315-1 and 315-2 as well as compass direction indicator 320 and location indicator 330.

According to some examples, FIG. 5 also shows a left 3-D model indicator 525-1 and a right 3-D model indicator 525-2. For these examples, suggestion manager 120 may include logic and/or features configured to determine a suggested 3-D model to capture a 3-D image at a given location. For example, the user may orient a camera such that the camera centers a front view of the chair shown in image view 510-A between upper and lower indicators 505-1 to 505-4. Since this may be the first image capture of the chair, left/right 3-D model indicators 525-1 and 525-2 in image view 510-A may include no indications of which subsequent image to capture.

In some examples, responsive to the user capturing the image shown in image view 510-A, suggestion manager 120 may update the 3-D image and then determine an updated suggested camera pose based on both the updated 3-D image and the suggested 3-D model. For these examples, an updated suggested camera pose is shown in FIG. 5 via various indicators around image view 510-B. For example, compass direction indicator 320 indicates a change from a north (N) facing direction in image view 510-A to now an east (E) facing direction in image view 510-B. Also, upper/lower indicators 505-1 to 505-4 indicate suggestions on how to center the next image.

According to some examples, right 3-D model indicator 525-2 is solid and left 3-D model indicator 525-1 is clear for image view 510-B. As mentioned above for image view 510-A, an image was captured of the front of the chair. Thus, the solid right 3-D model indicator 525-2 may indicate that previous image capture and the clear left 3-D model indicator 525-1 may indicate that the next picture is to be taken of the back of the chair according to the suggested 3-D model.

Although not shown in FIG. 5, up/down 3-D model indicators may also be included in camera display 500. For example, a suggested 3-D model may include capturing images from above and/or below an object as well as around a horizontal axis as mentioned above. These up/down 3-D model indicators may also indicate which images of the suggested 3-D model have been captured.

Suggestion manager 120 may also include logic and/or features configured to determine a suggested 3-D model based on one or more images already captured by a user at the given location or captured by some members of the user's social network at the given location. For example, one or more images may have been captured of a famous statue such as Michael Angelo's David. Suggestion manager 120 may base a 3-D model on those one or more images of David and guide the user to capture additional images of David in order to fill possible gaps in this suggested 3-D model.

Figure 6:
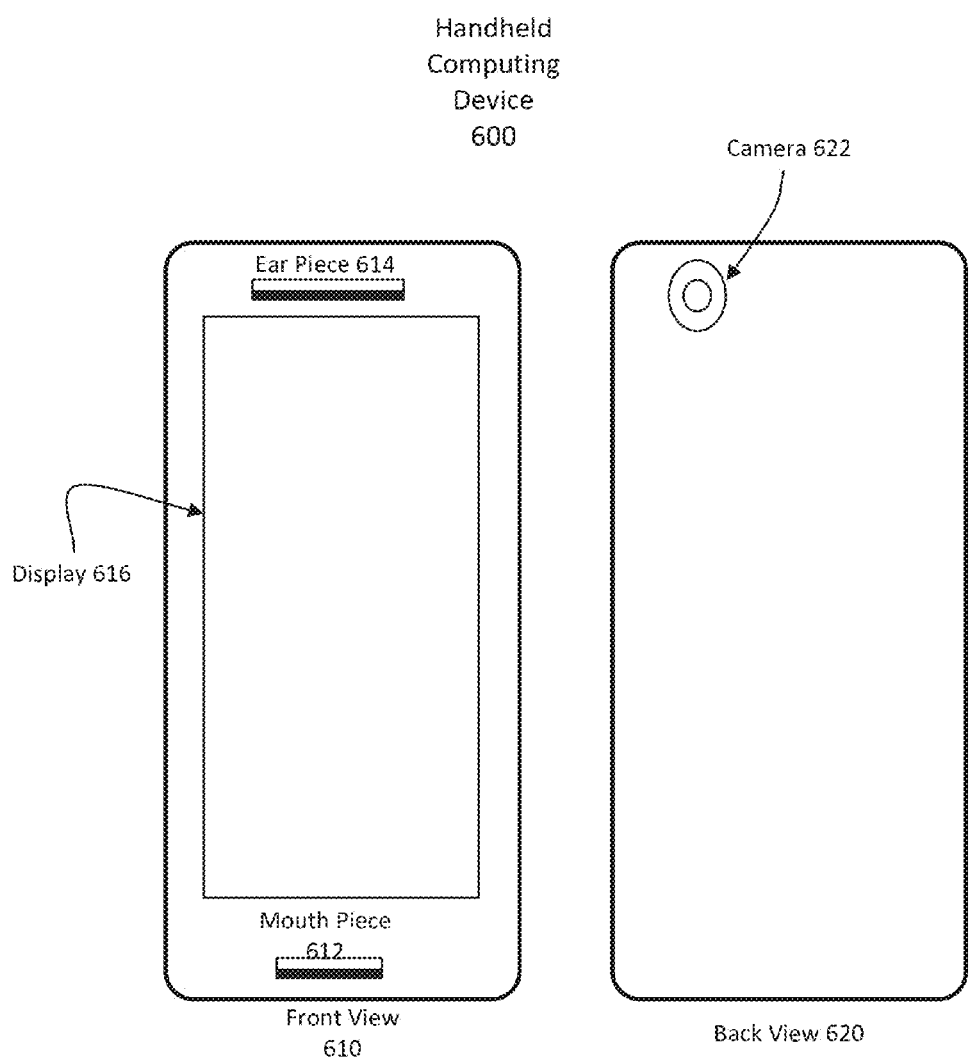
FIG. 6 illustrates an example handheld computing device having an integrated camera.

FIG. 6 illustrates an example handheld computing device 600 having an integrated camera. In some examples, a front view 610 and a back view 620 of handheld computing device 600 are shown in FIG. 6. For these examples, handheld computing device 600 includes a mouth piece 612, ear piece 614, a display 616 and a camera 622. Handheld computing device 600, for example, may be a smart phone, a tablet, a notebook computer, or an ultra-mobile computer.

According to some examples, handheld computing device 600 may include computing platform 100 as described above for FIG. 1. Also, handheld computing device 600 may be configured to communicatively couple to wireless network (not shown) via a wireless network connection (also not shown). In some examples, the wireless network connection may enable suggestion manager 120 to gather information associated with a user's interest in capturing an image with camera 622. The gathered information, for example, may be obtained from a social network associated with the user.

In some examples, suggestion manager 120 may provide guidance to a user of handheld computing device to orient camera 622 when capturing an image (e.g., at a given location). For these examples, guidance may be provided to the user via display 616. Depending on the user's interests, display 616, for example, may have similar indicators to the indicators mentioned above for FIGS. 3-5.

Figure 7:
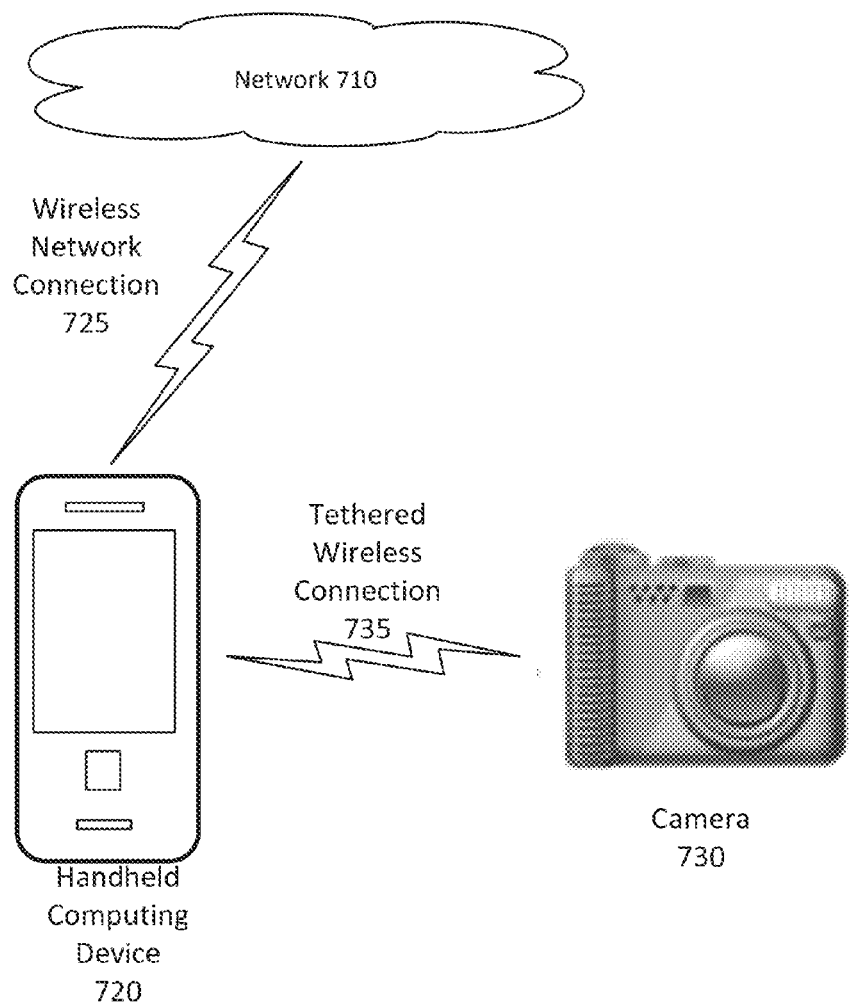
FIG. 7 illustrates an example mobile computing device tethered to a camera.

FIG. 7 illustrates an example hand held computing device 720 tethered to camera 730. In some examples, as shown in FIG. 7, handheld computing device 720 may be tethered to camera 730 via wireless connection 735. Also, as shown in FIG. 7, handheld computing device 720 may couple to network 710 via wireless network connection 725. For these examples, camera 730 may include computing platform 100 as described above and may utilize handheld computing device 720 to communicatively couple to network 725.

According to some examples, a user of camera 730 may have a wireless network account for handheld computing device 720 to enable wireless network connection 725 with network 710. However, for these examples, the user may not have an account to enable camera 730 to establish a direct wireless network connection with network 710. Instead, tethered wireless connection 735 may be established to enable camera 730 to indirectly communicatively couple to network 710 through handheld computing device 720. Tethered wireless connection 735 may include, but is not limited to, wireless connections such as Bluetooth™ or WiFi™.

In some examples, a suggestion manager 120 implemented at camera 730 may utilize the indirect network connection with network 710 through handheld computing device 720 to gather information associated with a user's interest in capturing an image with camera 730. The gathered information, for example, may be obtained from a social network associated with the user.

Figure 8:
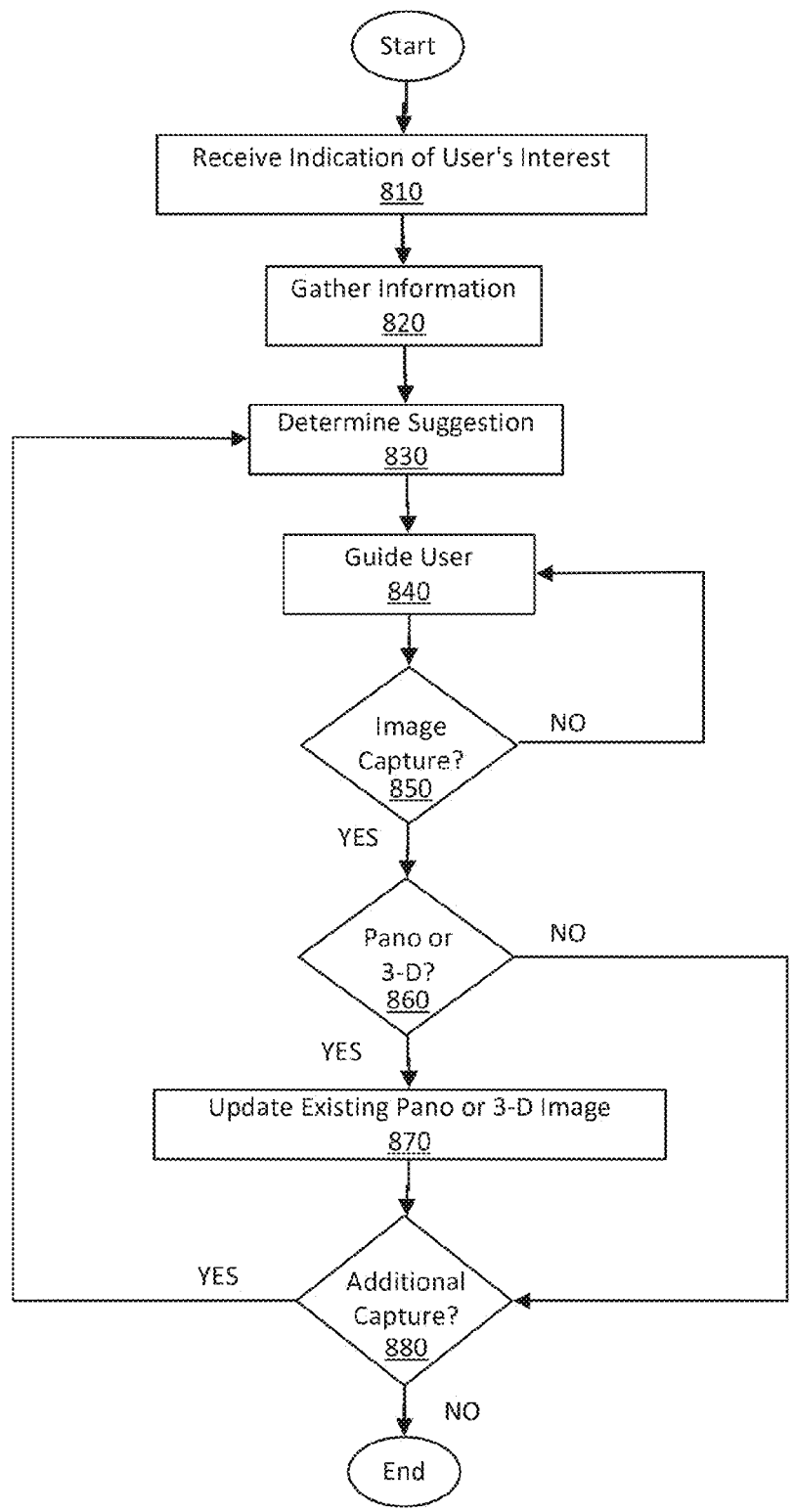
FIG. 8 illustrates a flow chart of example operations for guided image capture.

FIG. 8 illustrates a flow chart of example operations for guided image capture. In some examples, elements of computing platform 100 as shown in FIG. 1 may be used to illustrate example operations related to the flow chart depicted in FIG. 8. Suggestion manager 120 as shown in FIG. 1 and FIG. 2 may also be used to illustrate the example operations. But the described methods are not limited to implementations on computing platform 100 or to suggestion manager 120. Also, logic and/or features of suggestion manager 120 may provide guidance to a user via feedback on a display coupled to a camera such as the camera displays shown in FIGS. 3-5. However, the example operations may also be implemented using other types of feedback on cameras coupled to a display.

Moving from the start to block 810 (Receive Indication of User's interest), suggestion manager 120 may include logic and/or features configured to receive an indication of a user's interest in capturing one or more images with camera 145 (e.g., via receive feature 211). In some examples, the indication of the user's interest may include an indication to capture an image at a given location. The indication of the user's interest, for example, may be received by suggestion manager 120 responsive to the user activating camera 145 at or near the given location. For these examples, the image to be captured may be a single image, a panoramic image or a 3-D image.

According to some examples, the indication of the user's interest may include an indication to capture similar pictures as the user has taken before at or near the given location. The user's interest may also include an indication to capture similar or unique pictures to share with one or more members of a social network via which the user is also member. These similar or unique pictures may include a single image, a panoramic image or a 3-D image.

Proceeding from block 810 to block 820 (Gather Information), suggestion manager 120 may include logic and/or features configured to gather information associated with the user's interest (e.g., via gather feature 213). In some examples, the information associated with the user's interest may include information received from the user's social network. For these examples, the information received from the social network may include capture information for images captured by at least some members of the social network at or near the given location. For example, as shown in FIG. 3, the given location may be the Eiffel Tower in Paris, France or the Great Pyramids in Egypt. The capture information may include GPS location data, camera angle, compass direction and camera settings associated with separate image captures obtained by the members of the social network at the Eiffel Tower or the Great Pyramids.

According to some examples, the information associated with the user's interest may also include information associated with images the user had previously captured at the given location (e.g., the Eiffel Tower). For these examples, suggestion manager 120 may gather capture information associated with images stored on a computing device that includes computing platform 100 (e.g., maintained in storage 190) or maintained at a network accessible location (e.g., an on-line photo gallery or a social network). The capture information may include GPS location data, camera angle, compass direction and camera settings associated with the images previously captured by the user at the Eiffel Tower.

Proceeding from block 820 to block 830 (Determine Suggestion), suggestion manager 120 may include logic and/or features configured to determine a suggested camera pose and/or settings (e.g., via sensor feature 215, compare feature 216 or settings feature 217) based on the indication of the user's interest and the gathered information (e.g., via sensor feature 215 or settings feature 217). In some examples, the suggestion may be based on a type of image included in the indication of the user's interest to be captured at or near the given location. For these examples, the type of image may be included in the received indication of the user's interest based on a camera operation mode for camera 145. The user, following the activation of camera 145 at the given location, may have selected the camera operation mode. For example, a single shot mode selection may indicate a single image capture, a panorama or panoramic mode selection may indicate a panoramic image capture or a 3-D mode selection may indicate a 3-D image capture. The suggestion may also be based on information related to either the user's own captured images or the captured images of some of the user's social network.

According to some examples, the indication of the user's interest may include capturing similar types of images to those captured by the user's social network at or near a given location such as the Eiffel Tower. The gathered information associated with the user's interest may include GPS location data, compass direction or camera angles for separate image captures obtained either by the user or by members of the user's social network at or near the Eiffel Tower. Also, the gathered information may include possible camera settings (e.g., flash, zoom, shutter speed, aperture, etc.) obtained from the separate image captures or possibly obtained based on current conditions at the Eiffel Tower. The gathered information associated with the user's interest may also include visual features for separate image captures obtained either by the user or by members of the user's social network at or near the Eiffel Tower. Suggestion manager 120 may determine the suggested camera pose and/or settings based on the indicated user's interest to capture a similar image and based on the gathered information.

In some examples, suggestion manager 120 may include logic and/or features to analyze gathered information associated with the user's interest in order to find a similar image to capture according to the user's interest (e.g., via compare feature 216). For these examples, visual features from previously captured images (either the user's or others) may be compared to visual features recently captured by the user or being observed by camera 145. Suggestion manager 120 may then determine the suggested camera pose and/or settings based on this comparison.

Proceeding from block 830 to block 840 (Guide User), suggestion manager 120 may include logic and/or features configured to guide the user to adjust an actual camera pose and/or actual camera settings to match the suggested camera pose and/or suggested camera settings (e.g., via guide feature 218). In some examples, suggestion manager 120 may guide the user by providing feedback via display 143 coupled to camera 145. For these examples, the feedback may cause display 143 to indicate a suggested capture location, a suggested capture direction and a suggested capture angle. The feedback, for example, may be similar to at least some of the feedback described above for camera displays 300 or 500 in FIGS. 3-5. The feedback may also cause display 143 to indicate one or more suggested camera setting to include a flash setting, an aperture setting, a shutter speed or a zoom setting.

Proceeding from block 840 to decision block 850 (Image Capture?), suggestion manager 120 may include logic and/or features to determine whether an image has been captured by camera 145 at the given location (e.g., via update feature 219). In some examples, if an image has been captured the process moves to decision block 860. Otherwise, the process moves back to block 840.

Moving from decision block 850 to decision block 860 (Pano or 3-D?), based on the received indication of the user's interest a panoramic or 3-D image capture at the given location may have been included in the indication. In some examples, if the indication of the user's interest included an indication that either a panoramic or 3-D image was to be taken, the process moves to block 870. Otherwise, the process moves to decision block 880.

Moving from decision block 860 to block 870 (Update Existing Pano or 3-D Image), suggestion manager 120 may include logic and/or features configured to update an existing panoramic or 3-D image (e.g., via update feature 219)

responsive to an image capture by the user at the given location. In some examples, for updating a panoramic image, suggestion manager 120 may align the captured image with other images possibly captured at the given location either by the user or by some members of the user's social network. The aligned images may be according to a desired panoramic image at the given location from a first location point to a second location point. In some examples, for updating a 3-D image, suggestion manager 120 may update a suggested 3-D model that may have been generated by suggestion manager 120 to capture the 3-D image at the given location.

Proceeding from block 870 to decision block 880 (Additional Capture?), suggestion manager 120 may determine whether the user has indicated the capture of additional images at the given location. In some examples, the received indication of the user's interest may have included an indication to capture several single shot images at the given location. For these examples, the process may move back to block 830 to determine suggestions for subsequent image captures. Alternatively, the received indication of the user's interest may have included an indication to capture panoramic or 3-D images. Additional image captures may be warranted for capturing additional panoramic or 3-D images in order to fill identified gaps according to the updated panoramic or 3-D image mentioned above for block 870 when compared to the desired panoramic image or according to the suggested 3-D model. For these alternative examples, the process may move back to block 830. At block 830 suggestions may be determined to guide the user to adjust the actual camera pose to match an updated suggested camera pose to possibly fill gaps in either the desired panoramic image or to fill gaps in the suggested 3-D model. If no additional image captures are expected for either of the two examples mentioned above (e.g., all gaps have been filled), the process comes to an end. Also, if the received indication of the user's interest included an indication of only a single image capture, the process comes to an end.

Figure 9:
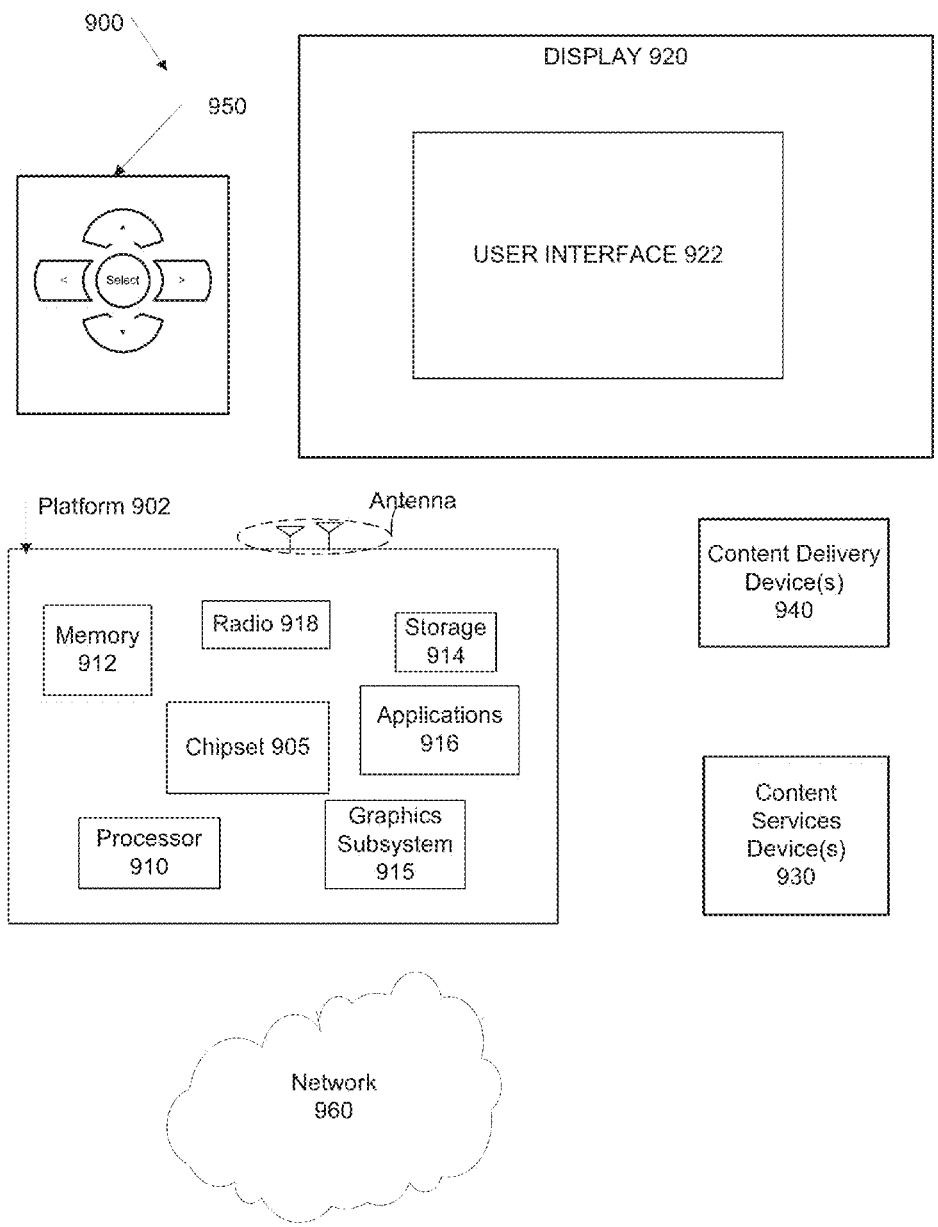
FIG. 9 illustrates an example system.

FIG. 9 illustrates an example system 900. In some examples, system 900 may be a media system although system 900 is not limited to this context. For example, system 900 may be incorporated into a personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

According to some examples, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in more detail below.

In some examples, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as Complex Instruction Set Computer (CISC) or Reduced Instruction Set Computer (RISC) processors, x86 instruction set compatible processors, multi-core, or any other microprocessor or central processing unit (CPU). In some examples, processor 910 may comprise dual-core processor(s), dual-core mobile processor(s), and so forth.

Memory 912 may be implemented as a volatile memory device such as, but not limited to, a RAM, DRAM, or SRAM.

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 914 may include technology to increase the storage performance enhanced protection for valuable digital media when multiple hard drives are included, for example.

Graphics subsystem 915 may perform processing of images such as still or video for display. Similar to the graphics subsystems described above for FIG. 1, graphics subsystem 915 may include a processor serving as a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. For some examples, graphics subsystem 915 could be integrated into processor 910 or chipset 905. Graphics subsystem 915 could also be a stand-alone card (e.g., a discrete graphics subsystem) communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some examples, display 920 may comprise any television type monitor or display. Display 920 may include, for example, a computer display screen, touch screen display, video monitor, television-like device, and/or a television. Display 920 may be digital and/or analog. For some examples, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

According to some examples, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In some examples, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 receives content such as cable television programming including media information, digital information, and/or other content. Examples of content providers may include any cable or satellite television or radio or Internet content providers. The provided examples are not meant to limit the scope of this disclosure.

In some examples, platform 902 may receive control signals from navigation controller 950 having one or more navigation features. The navigation features of controller 950 may be used to interact with user interface 922, for example. According to some examples, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some examples, controller 950 may not be a separate component but integrated into platform 902 and/or display 920. Although this disclosure is not limited to the elements or in the context shown for controller 950.

According to some examples, drivers (not shown) may comprise technology to enable users to instantly turn on and off platform 902 like a television with the touch of a button after initial boot-up, when enabled. Program logic may allow platform 902 to stream content to media adaptors or other content services device(s) 930 or content delivery device(s) 940 when the platform is turned "off." In addition, chip set 905 may include hardware and/or software support for 5.1 surround sound audio and/or high definition 7.1 surround sound audio, for example. Drivers may include a graphics driver for integrated graphics platforms. For some examples, the graphics driver may comprise a peripheral component interconnect (PCI) Express graphics card.

In various examples, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various examples, platform 902 and display 920 may be an integrated unit. Display 920 and content service device(s) 930 may be integrated, or display 920 and content delivery device(s) 940 may be integrated, for example. These examples are not meant to limit this disclosure.

In various examples, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The examples mentioned above, however, are not limited to the elements or in the context shown or described in FIG. 9.

Figure 10:
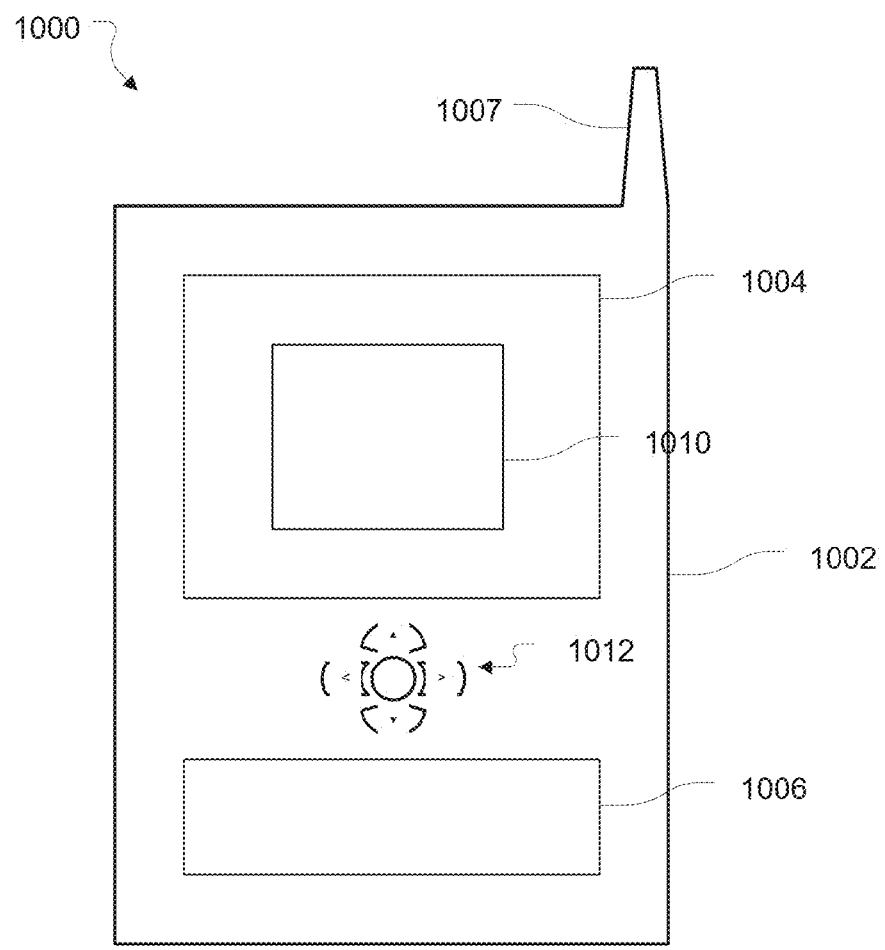
FIG. 10 illustrates an example device.

FIG. 10 illustrates an example device 1000. As described above, system 1000 may be embodied in varying physical styles or form factors. FIG. 10 illustrates examples of a small form factor device 1000 in which system 1000 may be embodied. In some examples, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-mobile computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. According to some examples, a mobile computing device may be implemented as a smart phone capable of executing computer applications, as well as voice communications and/or data communications. Although some examples may be described with a mobile computing device implemented as a smart phone by way of example, it may be appreciated that other examples may be implemented using other wireless mobile computing devices as well. The examples are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone. For some examples, a voice recognition device may digitize such information. Although the disclosure is not limited in this context.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

In some examples, operations described in this disclosure may also be at least partly implemented as instructions contained in or on an article of manufacture that includes a non-transitory computer-readable medium. For these examples, the non-transitory computer-readable medium may be read and executed by one or more processors to enable performance of the operations.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, by a processor circuit, an indication of interest of a user in capturing one or more images with a camera at a given location;
    gathering information associated with the interest of the user, the gathered information to comprise information received from a social network, the gathered information to include capture information for one or more captured images associated with one or more members of the social network, the capture information including at least one camera setting of another camera used to capture a captured image of the one or more captured images and a visual feature of the captured image, the one or more captured images captured at the given location;
    comparing the visual feature of the captured image to a visual feature of an image captured or observed by the camera;
    determining a suggested camera pose and a suggested camera setting based on the indication of the interest of the user, the gathered information, and the comparison of the visual feature of the captured image to the visual feature of the image captured or observed by the camera; and
    providing guidance to adjust an actual camera pose to match the suggested camera pose.

2. The method of claim 1, comprising providing guidance by providing feedback via a display coupled to the camera, the feedback to cause the display to indicate a suggested capture location, a suggested capture direction and a suggested capture angle based on the one or more images captured by one or more members of the social network at the given location, responsive to the feedback the user to adjust an actual camera location, an actual capture direction and an actual capture angle to match the suggested capture location, the suggested capture direction and the suggested capture angle.

3. The method of claim 1, comprising communicatively coupling to the social network via a wireless network connection to receive the gathered information.

4. The method of claim 3, the camera comprising a built-in camera for a wireless computing device having wireless network capabilities to establish the wireless network connection, the wireless computing device to include one of a smart phone, a tablet, a notebook computer, or an ultra-mobile computer.

5. The method of claim 3, the camera to establish a tethered wireless connection with one of a smart phone, a tablet, a notebook computer, or an ultra-mobile computer, the tethered wireless connection to enable the camera to communicatively couple to the social network via the wireless network connection.

6. The method of claim 1, the indication of interest of the user to include capturing the one or more images to create a panoramic image from a first location point at the given location to a second location point at the given location and providing guidance to include providing feedback via a display coupled to the camera, the feedback to cause the display to indicate a suggested capture location, a suggested capture direction and a suggested capture angle, responsive to the feedback the user to adjust the actual camera pose to include adjusting an actual capture location, an actual capture direction and an actual capture angle to match the suggested capture location, the suggested capture direction and the suggested capture angle.

7. The method of claim 6, comprising:
    updating the panoramic image responsive to a first capture by the user following the user matching the actual camera pose with the suggested camera pose;
    determining an updated suggested camera pose based on the updated panoramic image; and
    providing guidance to adjust the actual camera pose to match the updated suggested camera pose.

8. The method of claim 7, comprising determining the updated suggested camera pose based on identifying a gap in the updated panoramic image, the gap falling between the first location point and the second location point.

9. The method of claim 6, the gathered information to include capture information for one or more images captured by one or more members of the social network from the first location point at the given location to the second location point at the given location.

10. The method of claim 9, comprising providing guidance by providing feedback via a display coupled to the camera, the feedback to cause the display to indicate a suggested capture location, a suggested capture direction and a suggested capture angle based on the one or more images captured by one or more members of the social network from the first location point at the given location to the second location point at the given location, responsive to the feedback the user to adjust the actual camera pose to include adjusting an actual capture location, an actual capture direction and an actual capture angle to match the suggested capture location, the suggested capture direction and the suggested capture angle.

11. The method of claim 10, comprising:
updating the panoramic image responsive to a first capture by the user following the user matching the actual camera pose with the suggested camera pose;
determining an updated camera pose based on the updated panoramic image and on the one or more images captured by the one or more members of the social network from the first location point at the given location to the second location point at the given location; and
providing guidance to adjust the actual camera pose to match the updated suggested camera pose.

12. The method of claim 1, the indication of interest of the user to include capturing the one or more images to create a three-dimensional image at a given location and providing guidance to include providing feedback via a display coupled to the camera, the feedback to cause the display to indicate a suggested capture location, a suggested capture direction and a suggested capture angle based on a suggested three-dimensional model, responsive to the feedback the user to adjust the actual camera pose to include adjusting an actual capture location, an actual capture direction and an actual capture angle to match the suggested capture location, the suggested capture direction and the suggested capture angle.

13. The method of claim 12, comprising:
updating the three-dimensional image responsive to a first capture by the user following the user matching the actual camera pose with the suggested camera pose;
determining an updated suggested camera pose based on the updated three-dimensional image and the three-dimensional model; and
providing guidance to adjust the actual camera pose to match the updated suggested camera pose.

14. The method of claim 13, comprising determining the updated suggested camera pose based on identifying a gap in the updated three-dimensional image when compared to the three-dimensional model.

15. The method of claim 1, comprising:
determining one or more suggested camera settings to include at least one of a flash setting, an aperture setting, a shutter speed or a zoom setting;
providing guidance to adjust one or more actual camera settings to match the one or more suggested camera settings.

16. An apparatus comprising:
a processor circuit; and
a memory unit communicatively coupled to the processor circuit, the memory unit arranged to store a suggestion manager operative on the processor circuit to receive an indication of interest of a user to capture one or more images with a camera at a given location, the suggestion manager configured to gather information associated with the interest of the user, the gathered information to comprise information received from a social network, the gathered information to include capture information for one or more captured images associated with one or more members of the social network, the capture information to include at least one camera setting of another camera used to capture a captured image of the one or more captured images and a visual feature of the captured image, the one or more captured images captured at the given location, to compare the visual feature of the captured image to a visual feature of an image captured or observed by the camera, to determine a suggested camera pose and a suggested camera setting based on the indication of the interest of the user, the gathered information, and the comparison of the visual feature of the captured image to the visual feature of the image captured or observed by the camera, the suggestion manager also configured to provide guidance to adjust an actual camera pose to match the suggested camera pose.

17. The apparatus of claim 16, comprising a display, the suggestion manager to provide guidance with feedback provided via the display.

18. The apparatus of claim 16, the indication of interest of the user to include capture of the one or more images to create a panoramic image from a first location point at a given location to a second location point at the given location, the suggestion manager configured to provide guidance, the guidance to include feedback via a display coupled to the camera, the feedback to cause the display to indicate a suggested capture location, a suggested capture direction and a suggested capture angle, responsive to the feedback the user to adjust the actual camera pose to include adjustment of an actual capture location, an actual capture direction and an actual capture angle to match the suggested capture location, the suggested capture direction and the suggested capture angle.

19. The apparatus of claim 18, the suggestion manager configured to update the panoramic image responsive to a first capture by the user when the actual camera pose matches the suggested camera pose and determine an updated suggested camera pose based on the updated panoramic image, the suggestion manager also configured to provide guidance to adjust the actual camera pose to match the updated suggested camera pose.

20. The apparatus of claim 19, the suggestion manager configured to determine the updated suggested camera pose based on identification of a gap in the updated panoramic image, the gap located between the first location point and the second location point.

21. The apparatus of claim 16, the indication of interest of the user to include capture of the one or more images to create a three-dimensional image at the given location and the guidance to include feedback via a display coupled to the camera, the feedback to cause the display to indicate a suggested capture location, a suggested capture direction and a suggested capture angle based on a suggested three-dimensional model, responsive to the feedback the user to adjust the actual camera pose to include adjustment of an actual capture location, an actual capture direction and an actual capture angle to match the suggested capture location, the suggested capture direction and the suggested capture angle.

22. The apparatus of claim 21, the suggestion manager configured to update the three-dimensional image responsive to a first capture by the user when the actual camera pose matches the suggested camera pose and determine an updated suggested camera pose based on the updated three-dimensional image and the three-dimensional model, the suggestion manager also configured to provide guidance to adjust the actual camera pose to match the updated suggested camera pose.

23. The apparatus of claim 22, the suggestion manager configured to determine the updated suggested camera pose based on identification of a gap in the updated three-dimensional image when compared to the three-dimensional model.

24. An article of manufacture comprising a non-transitory storage medium comprising instructions that when executed cause a system to:

receive an indication of interest of a user to capture one or more images with a camera at a given location;

gather information associated with the interest of the user, the gathered information to comprise information received from a social network, the gathered information to include capture information for one or more captured images associated with one or more members of the social network, the capture information to include at least one camera setting of another camera used to capture a captured image of the one or more captured images and a visual feature of the captured image, the one or more captured images captured at the given location;

compare the visual feature of the captured image to a visual feature of an image captured or observed by the camera;

determine a suggested camera pose and a suggested camera setting based on the indication of the interest of the user, the gathered information, and the comparison of the visual feature of the captured image to the visual feature of the image captured or observed by the camera; and provide guidance to adjust an actual camera pose to match the suggested camera pose.

25. The article of manufacture of claim 24, comprising instructions to cause the system to provide guidance with feedback via a display coupled to the camera, the feedback to cause the display to indicate a suggested capture location, a suggested capture direction and a suggested capture angle based on the one or more images captured by one or more members of the social network at the given location, responsive to the feedback the user to adjust an actual camera location, an actual capture direction and an actual capture angle to match the suggested capture location, the suggested capture direction and the suggested capture angle.

26. The article of manufacture of claim 24, the camera comprising a built-in camera for a wireless computing device, the wireless computing device to communicatively couple to the social network via a wireless network, the wireless computing device to include one of a smart phone, a tablet personal computer, a notebook personal computer, or an ultra mobile personal computer.

27. The article of manufacture of claim 24, comprising the camera to establish a tethered wireless connection with one of a smart phone, a tablet personal computer, a notebook personal computer, or an ultra mobile personal computer, the tethered wireless connection to enable the camera to communicatively couple to the social network via a wireless network connection.

28. The article of manufacture of claim 24, comprising instructions to cause the system to:
    determine one or more suggested camera settings to include at least one of a flash setting, an aperture setting, a shutter speed or a zoom setting;
    provide guidance to adjust one or more actual camera settings to match the one or more suggested camera settings.

* * * * *